Figure 1:
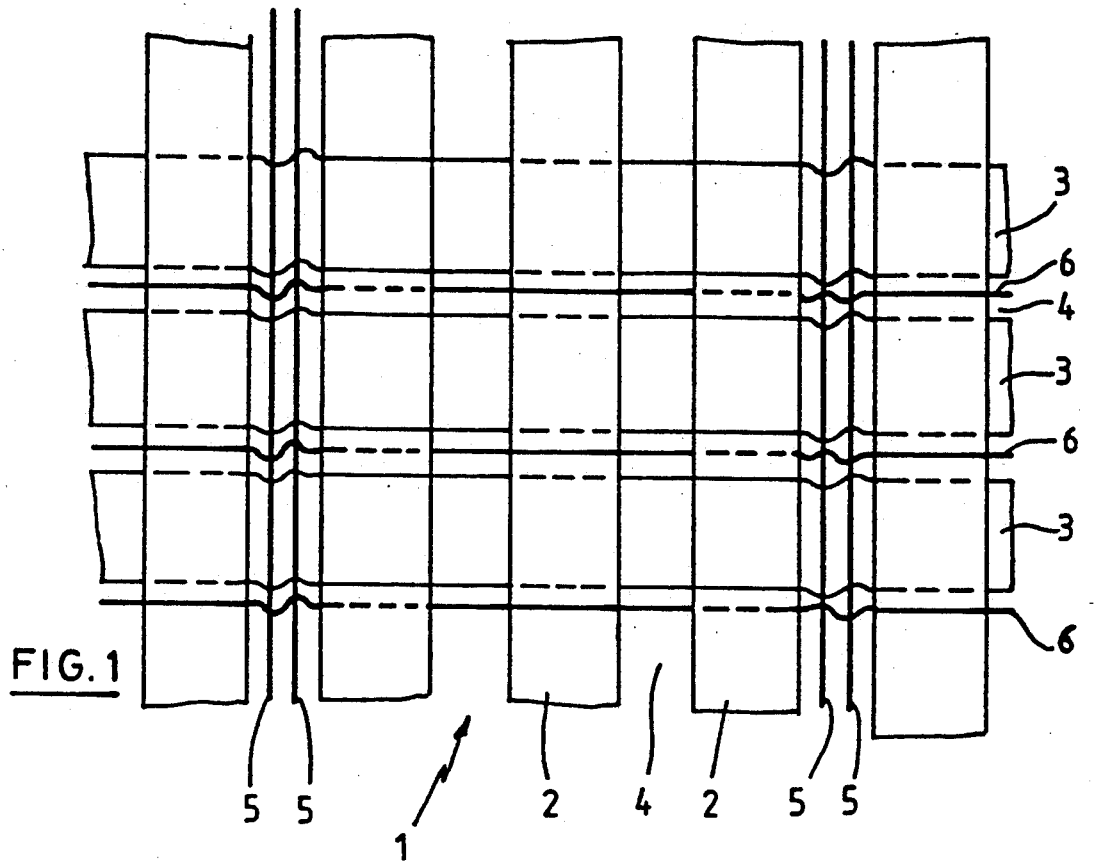

United States Patent [19]

De Decker

[11] Patent Number: 5,288,545
[45] Date of Patent: Feb. 22, 1994

[54] TINTING AND INSULATING SCREEN LINED WITH HYDROPHILIC TEXTILE THREADS

[75] Inventor: Oscar De Decker, Gent, Belgium

[73] Assignee: Bonar Phormium N.V., Zele, Belgium

[21] Appl. No.: 730,892

[22] PCT Filed: Jan. 26, 1990

[86] PCT No.: PCT/BE90/00004
§ 371 Date: Jul. 30, 1991
§ 102(e) Date: Jul. 30, 1991

[87] PCT Pub. No.: WO90/08459
PCT Pub. Date: Aug. 9, 1990

[30] Foreign Application Priority Data

Jan. 31, 1989 [BE] Belgium .................... 8900096

[51] Int. Cl.$^5$ ............................................. D03D 3/00
[52] U.S. Cl. .................... 428/226; 47/31; 139/29; 139/457; 428/225; 428/229; 428/257; 428/258; 428/259
[58] Field of Search ............. 428/257, 258, 259, 225, 428/226, 229; 47/31; 139/29, 457

[56] References Cited

U.S. PATENT DOCUMENTS

| | | | |
|---|---|---|---|
| 3,567,565 | 3/1971 | Jones et al. | 428/226 |
| 4,030,892 | 6/1977 | Mendelsohn et al. | 428/226 |
| 4,097,631 | 6/1978 | Wilken | 428/226 |
| 4,399,671 | 8/1983 | Henningsson | 66/196 |
| 4,626,465 | 12/1986 | Henningsson | 428/229 |
| 4,632,863 | 12/1986 | Henningsson | 428/225 |
| 4,644,684 | 2/1987 | Verbeeck | 47/31 |
| 4,761,913 | 8/1988 | Henningsson et al. | 428/226 |
| 5,164,250 | 11/1992 | Rodriguez | 428/226 |

FOREIGN PATENT DOCUMENTS

2035299 12/1970 France.

*Primary Examiner*—James J. Bell
*Attorney, Agent, or Firm*—Sughrue, Mion, Zinn, Macpeak & Seas

[57] ABSTRACT

A dense and stable shading and insulating screen (1) can be pulled away sideways and rolled up, provided it has a double weave. Fabric fibers which both as weft (6) and warp elements (5) hold together tightly both weft (3) and warp strips (2) in a stable pattern or supporting weave, have a positive impact on the light transmission of the screen (1), by absorbing the water to the inside of the screen and, resulting from surface activity, having the water transferred to the outside of the screen (1).

5 Claims, 1 Drawing Sheet

TINTING AND INSULATING SCREEN LINED WITH HYDROPHILIC TEXTILE THREADS

This invention comprehends a shading and insulating screen comprising several flexible, parallel flat strips, extending completely flat lentgthways, without overlapping one another, and some transverse as well as longitudinal water absorbing fabric fibres interconnecting the strips and providing free interspaces between the edges of two adjacent strips, resulting in equal permeability over the whole surface.

It is mainly applied in market-gardening and ornamental plant cultivation on screens and blackout fabrics, to protect flowers and/or vegetables which are cultivated in greenhouses or in the open air.

The invention also relates to a procedure for manufacturing fabric by means of a circular or straight loom.

From EP-A-0089422 a shading and insulating screen fabric is known, made of thin strips of synthtic material, which are interwoven to form a sufficiently dense draughtboard to be impermeable to water but still permeable to water vapours and gases.

The strips are 25 to 50 microns thick and some 1.2 to 5.0 mm wide. They are arranged completely flat, without overlapping one another, so that between the edges of two adjacent strips some minimal interspaces appear, evenly distributed over the whole of the screen.

The manufacturing process allows easy screen light intensity adjustment and dosing, by means of alternating one or more transparent strips with some metallized strips.

The screen is extremely solid and durable, despite the use of a fragile and easy-to-wrap metallized polyester film or pure metal film.

EP-A-0109951 has taught us that instead of using lime dressing as a blackout means, in a greenhouse, a greenhouse curtain should be used, consisting of several flexible strips only extending lenghtways of the fabric and connected to one another by means of transverse and longitudinal fabric fibres. The longitudinal connective threads are mainly located at the underside of the strips near the interspaces between adjacent strips.

The transverse connective threads are located at the upper side and the underside of the fabric, and are connected to the longitudinal threads. The width of the strips corresponds with that of the interspace between the longitudinal connective threads with only the transverse connective threads in between. The upper side has some reflecting or non-reflecting and/or permeable or impermeable properties, so that it may or may not reflect or transmit the sunrays. The connective fibres are made of a certain kind of material, which will absorb the water because of surface activity.

The curtain is two-sided. The underside has some hydrophilic fabric properties, thanks to the presence of connective fibres which absorb and distribute the water by means of surface activity between the adjacent strips. The upper side has some reflecting properties and will reflect the sunrays.

Nevertheless, this screen can be rolled up or pulled away sideways only with great difficulty, because it gets easily distorted under side pressure.

The longitudinal threads are located in the interspaces between adjacent strips, close to the edges of the strips, without being in the way, so that the volume of the rolled-up curtain gets smaller. However, the fabric has a loose weave, because the longitudinal strips are not really tightened against one another. The fabric is distorted and tends to take a slanting position when the screen is pulled away or rolled up.

From EP-A-0029 173 we know that a greenhouse curtain should be set up as an insulating material, with a heat reflecting material positioned between the double parallel fabric strips. The double insulating fabric has a very good insulating and reflecting capacity, but because it requires double fabric bands, its cost price gets considerably high. These bands are connected with one another by means of a special construction.

Therefore, rolling up, hanging up or bringing together requires considerable space at both sides.

Said invention however, is to do away with these disadvantages. The new screen belongs to the kind described in conclusion 1 and which, apart from heat and light reflecting properties, gas permeability, water and moisture absorption, also have stability properties and strength.

The invented screen is rather peculiar in the way that the longitudinal strips and the transverse strips are interwoven to form a draughtboard of which the former represent the warp elements, whereas the transverse strips represent the weft elements, and the fabric fibres are both the weft and the warp elements holding together the above strips into a stable pattern or bearing structure.

Both warp and weft strips are alternatingly transparent and dark, or alternatingly transparent and reflecting.

The connective threads are synchronic with the base strips of the supporting weave of the screens, with alternating planes.

The transverse fibres alternate at the upper side and underside of the strips; which serve as connective elements.

Particular for the weave is that a higher value of light transmission is obtained at extreme temperature conditions.

Further particulars and details will result from the description of the enclosed drawings, which are schematic and non-restrictive representations of different forms of shading screens with regular weft, made in accordance with the manufacturing process of the newly invented screen.

Figure 2:
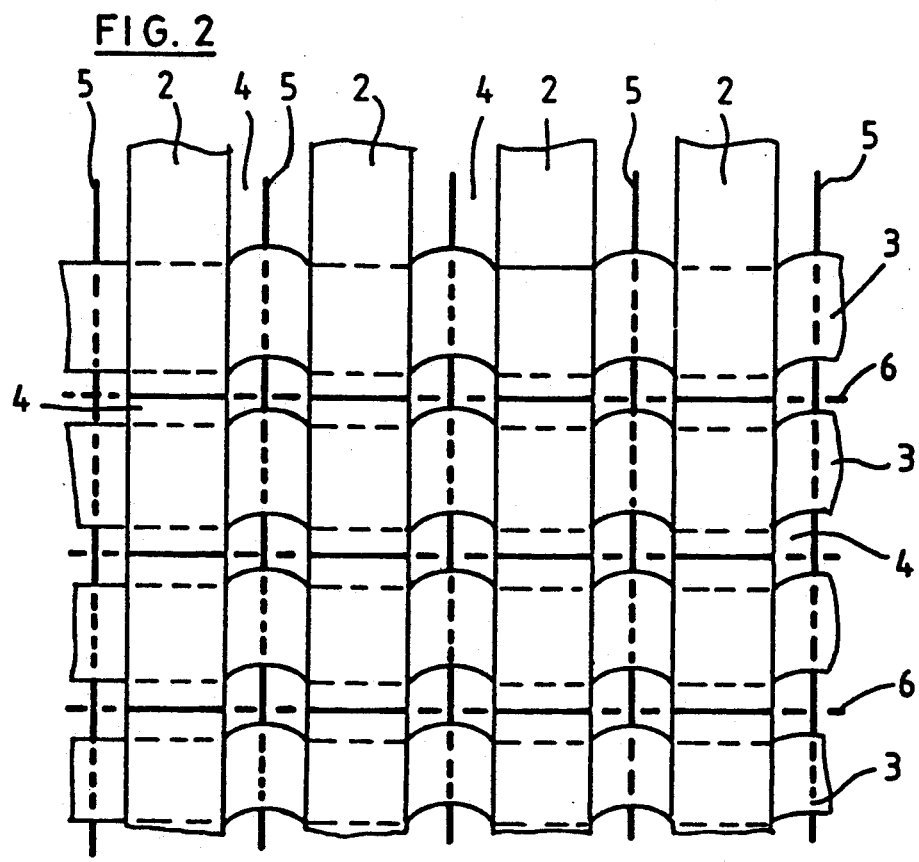

These drawings represent:

FIG. 1: an enlarged view from above of a screen weave comprising two close longitudinal water absorbing fabric fibres 5, and FIG. 2: an enlarged view from above of a screen weave comprising simple longitudinal water absorbing fabric fibres 5.

In these drawings, equal or similar elements are indicated by means of one and the same reference figure.

As shown in FIG. 1, a possible representation of shading and insulating screen 1 according to invention, marked by reference FIG. 1, comprises a draughtboard made of strips 2 and 3, both extending in longitudinal as well as transverse direction, and interwoven both as weft and warp elements, with two adjacent strips showing interspaces 4, which are evenly distributed over the whole of screen 1.

Interspace 4 between the strips is represented on an enlarged scale in order to have a much clearer view of the weave. In reality, the edges of strips 2 and 3 are close to one another.

Both longitudinal strips 2 and transverse strips 3 are connected to one another by means of longitudinal and transverse water absorbing fabric fibres 5 and 6.

In case of extreme weather conditions with important temperature fluctuations, some vapour appears on the screen and water drops settle themselves between the weave crossing or on the strips. These water drops result in a decrease in light under screen 1, by means of reflection and absorption of the sunrays.

The advantage is that both longitudinal fibres 5 and transverse fibres 6 alternate at the upper side and the underside of a series of adjacent strips. The fact that connective fibres 5 and 6 have alternating surfaces, results in a higher absorption of the enclosed drops. By means of surface activity, the water that is absorbed by those threads that are located under a strip, is transferred to the part of the fibre that is located at the upper side of a strip, where it is evaporated. This way, part of the water of condensation is withdrawn from the greenhouse.

It goes without saying that the light transmission of screen 1 is restored by extracting the enclosed drops of water.

But apart from light transmission, also greenhouse heating is influenced by the presence of enclosed water drops.

It has been established that the enclosed drops first evaporate, namely by extracting heat from the screen and the environment. This automatically has a delaying impact on the greenhouse warm-up cycle.

A third advantage consists of the preservation of the small screen volume, despite adding connective fibres 5 and 6 as filling structure. If not used, the screen is rolled or folded up. It is obvious that a compact volume results in less shading and therefore is favourable to growth.

Warp strips 2 are preferably transparent or reflecting, weft strips 3 transparent or reflecting, and warp threads 5 and weft threads 6 UV stabilized fibres.

FIG. 2 gives a second possible representation of shading and insulating screen 1 according to invention. The number of water absorbing fibres 5 adjacent to each warp strip 2 in the weave, is restricted to one. The number of absorbing fibres adjacent to each warp or weft strip and/or the number of strips between two absorbing warp or weft threads constitute no restrictive particularity of the invention.

The invention also relates to a procedure of manufacturing the fabric by means of a circular or straight handloom. The transverse threads 6 may or may not alternate at the upper side and the underside of warp strips 2, serving as holding material for the pattern.

Thanks to the particular "one over, one under" weave of the shading and insulating screen made of strips 2 and 3 on the one hand, and fibres 5 and 6 on the other hand, both by means of a straight and circular handloom, the strips are prevented from turning over or toppling, because the weft and warp strips are closely on top of one another. At both types of handlooms, adapted weft and warp strips dividing equiment may ensure equal tension on weft and warp strips. If necessary, additional measures may be taken to avoid any folds or twists in the strips that form the warp and weft elements, in either direction.

In case of a straight handloom for example, transparent strips will be used in weft direction and metallized strips only in warp direction, so as to cover almost completely any irregularities in the canvas formed by the above screen, resulting from the torsion of each turn at uncoiling in the transverse direction.

By the way, even without any adaptations a straight handloom with projectile is suitable for weaving a shading screen.

In case of a circular loom, the shuttle will be positioned preferably in such a way that unwinding is realized in a direction upright to the weft coiling axle, thus avoiding any twists in the weft strip.

By filling up the basic weave connective fibres, a stable fabric is obtained, resulting in a dense double weave, on its turn allowing easy handling of the sreen for installing purposes.

I claim:

1. Shading and insulating screen (1) consisting of several flexible parallel flat warp strips (2), extending lengthways without overlapping one another, and of both transversal and longitudinal water absorbing weft fabric fibres (6), interconnecting the warp strips (2) and showing some free interspaces (4) between the edges of two adjacent strips, resulting in a permeability which is evenly distributed over the whole screen (1). characterized in that the longitudinal (6) and transversal (5) fabric fibres are water absorbing textile threads which are individually and separately interwoven at the upper side and the underside of the fibres and the strips (2,3) according a structure and are serving as holding material for the canevas so that they hold the above strips tightly together in a stable pattern or supporting weave.

2. Shading and insulating screen according to claim 1, characterized in that the transverse strips (3) are transparent and are always at the underside of the warp strips.

3. Shading and insulating screen according claim 1, characterized in that the transversal and longitudinal fibres (5,6) are water absorbing textile fabric fibres.

4. Procedure for manufacturing a shading and insulating screen according to claim 1, characterized in that a circular loom is used, the shuttle positioned in such a way that unwinding is realized in a direction upright to the weft coiling axle.

5. Procedure for manufacturing a fabric according to claim 1, characterized in that a straight handloom with projectile is used, in which transparent strips are arranged in weft direction and metallized strips only in warp direction.

* * * * *